United States Patent
Narita et al.

(10) Patent No.: US 7,526,469 B2
(45) Date of Patent: Apr. 28, 2009

(54) METHOD AND SYSTEM OF DATABASE MANAGEMENT WITH SHARED AREA

(75) Inventors: Masaaki Narita, Yokohama (JP); Nobuo Kawamura, Atsugi (JP); Kiyomi Hirohata, Sagamihara (JP); Ryuichi Hoshino, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 224 days.

(21) Appl. No.: 11/302,174

(22) Filed: Dec. 14, 2005

(65) Prior Publication Data
US 2006/0161539 A1 Jul. 20, 2006

(30) Foreign Application Priority Data
Dec. 15, 2004 (JP) ............................. 2004-362616

(51) Int. Cl.
*G06F 17/30* (2006.01)
(52) U.S. Cl. .................. 707/2; 707/3; 707/4; 707/205; 707/8
(58) Field of Classification Search ...................... 707/3, 707/4, 5
See application file for complete search history.

(56) References Cited

U.S. PATENT DOCUMENTS

2008/0010283 A1* 1/2008 Cornwell et al. ............... 707/8

OTHER PUBLICATIONS

"Oracle9i Real Application Clusters-Cache Fusion Delivers Scalability, An Oracle White Paper", Oracle Corporation, May 2001, pp. 7-9, pp. 12-13.

* cited by examiner

*Primary Examiner*—Cam Y T Truong
(74) *Attorney, Agent, or Firm*—Mattingly, Stanger, Malur & Brundidge, P.C.

(57) ABSTRACT

Database processing including processing for a shared table is efficiently executed. Processing for a database including a shared table which can be referred to by a plurality of database processing devices is managed. Table information indicating database processing devices allocated according to an attribute of a table in a database and a processing type is referred to via a storage. According to whether or not a processing request for the database includes processing for a shared table, a database processing device to execute the processing request is selected. The database processing request is issued to the selected database processing. According to the database processing request, the database processing device accesses the database.

6 Claims, 13 Drawing Sheets

FIG.5

| TABLE NAME | SHARED TABLE ATTRIBUTE | ALLOCATED BACK-END SERVER NAME | REFERRING BACK-END-SERVER NAME |
|---|---|---|---|
| TABLE A-a | NO | BACK-END SERVER a | BACK-END SERVER a |
| TABLE A-b | NO | BACK-END SERVER b | BACK-END SERVER b |
| TABLE A-c | NO | BACK-END SERVER c | BACK-END SERVER c |
| TABLE B | YES | BACK-END SERVER b | BACK-END SERVER a |
|  |  |  | BACK-END SERVER b |
|  |  |  | BACK-END SERVER c |

551 552 553 554

TABLE INFORMATION 550

FIG.6

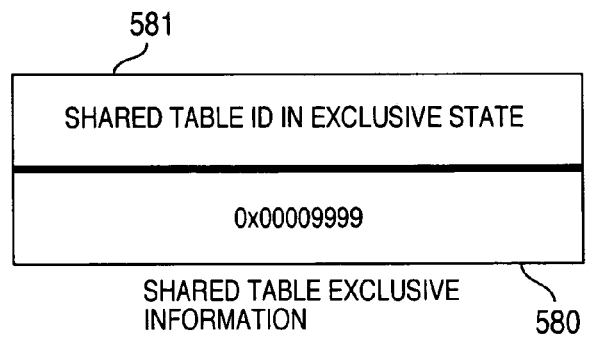

581

| SHARED TABLE ID IN EXCLUSIVE STATE |
|---|
| 0x00009999 |

SHARED TABLE EXCLUSIVE INFORMATION 580

METHOD AND SYSTEM OF DATABASE MANAGEMENT WITH SHARED AREA

INCORPORATION BY REFERENCE

The present application claims priority from Japanese application JP 2004-362616 filed on Dec. 15, 2004, the content of which is hereby incorporated by reference into this application.

BACKGROUND OF THE INVENTION

The present invention relates to a database management technique to manage access to a database, and in particular, to a technique effectively applicable to a database management technique to manage access to a database including a shared table placed in a database storage area which can be referred to by a plurality of back-end servers.

Database management systems (DBMS) including a plurality of servers are classified into shared-disk DBMS and shared-nothing DBMS. In the shared-disk scheme, all servers can access all databases and hence the loads are distributed among the servers. However, it is necessary to control synchronization among the servers. In the shared-nothing scheme, the load is especially imposed on a particular server allocated with a database storage area which is frequently referred to. However, the synchronization control is not required among the servers. Techniques of this kind are described in pages 7 to 9 and 12 to 13 in "Oracle9i Real Application Clusters—Cache Fusion Delivers Scalability, An Oracle White Paper" described by Sohan Demel and published from Oracle Corporation in May 2001.

SUMMARY OF THE INVENTION

In the shared-disk scheme, since joint retrieval can be performed by changing an access path, the joint retrieval is achieved with load less than that required in the shared-nothing scheme. However, when contents of the database are updated, synchronization control is necessary to update data in a buffer of each back-end server.

On the other hand, in the shared-nothing scheme, when joint retrieval is conducted using a first table which is frequently referred to and which cannot be partitioned or subdivided into a plurality of database storage areas for storage thereof and a second table, there appear load to copy retrieved data between the back-end servers and load imposed on the copy destinations. This consequently leads a problem of centralization of load on a particular back-end server and a large amount of data transferred between the servers in the database management system.

Assume in the above situation that a table which is frequently referred to is designated as a shared table which is referred to by all back-end servers. For the shared table, it is not necessary to copy retrieved data between the back-end servers. However, when an operation to update the table is started, only a back-end server executing the update processing can access the shared table during a period of time from a start of the update operation to an end of an associated synchronization control operation. That is, the back-end server which can access the shared table changes depending on the contents or type of the processing executed for the shared table. This consequently results in a problem that the back-end server to access the shared table cannot be fixed in the processing for the shared table.

It is therefore an object of the present invention to provide a technique capable of effectively execute database processing including processing for a shared table to thereby remove the problem.

According to the present invention, in a database management system for managing processing for a database including a shared table which can be referred to by a plurality of database processing devices, the system selects a database processing device from the plural database processing devices according to whether or not a processing request for the database includes processing for the shared table such that the selected database processing device accesses the database.

The database management system according to the present invention includes a front-end server for receiving a statement described in a Structured Query Language (SQL), executing analysis of the SQL statement and optimization processing, determining a method of accessing a database, and indicating the contents of execution to a back-end server; a back-end server for accessing the database according to the indication from the front-end server, conducting exclusive control, and executing an arithmetic operation; a database storage area to be accessed by a particular back-end server, and a network connecting the above constituent components to each other. The servers may be computers, information processors, and/or programs and objects to execute various processing on the computers and the information processors.

A table to be frequency referred to is set as a shared table which can be referred to by any back-end server. When a processing request for a database is received, the front-end server accesses a storage to refer to table information indicating database processing devices allocated according to attributes of tables in the database and a type of processing to determine attributes (i.e., a shared table or a partitioned table) of tables to be processing by the processing request and a processing type (processing to refer to information or processing to update data). Depending on the attributes of the tables and the processing type, the front-end server selects a back-end server to access the tables and issues the processing request to the back-end server such that the back-end server processes the database. When the processing request is received, the back-end server executes processing for the database according to the contents of processing to thereby access the database.

For example, in a case in which the processing request includes joint retrieval using a partitioned table and a shared table, the front-end server acquires, from the above table information, names of back-end servers capable of referring to the partitioned table and names of back-end servers capable of referring to the shared table and then extracts back-end servers capable of referring to the partitioned and shared tables. The front-end server sends to each back-end server a processing request to conduct joint retrieval according to partitioned data of the partitioned table and the shared table which can be referred to by the back-end servers thus extracted to thereby indicate the back-end server to carry out the joint retrieval.

According to the update processing of the shared table, the back-end server to be selected is changed. During a period of time from the update of the shared table to an associated synchronization operation, i.e., during a period of time in which the shared table is exclusively used, the system transfers, to the back-end server having executed the update processing, table data such as table data of the partitioned table of each of the other back-end servers. Resultantly, the system executes joint processing for the table data of the partitioned table and that of the shared table. If the shared table is not exclusively used, the shared table is accessed by the plural back-end servers to execute joint processing using the table data of the partitioned table of each back-end server and the shared table data.

Through the above operations, it is possible to efficiently execute database processing including processing for a shared table.

Other objects, features and advantages of the invention will become apparent from the following description of the embodiments of the invention taken in conjunction with the accompanying drawings.

BRIEF DESCRIPTION OF THE DRAWINGS

FIG. 5 is a diagram showing an example of table information;

FIG. 6 is a diagram showing an example of shared table exclusive information;

DESCRIPTION OF THE EMBODIMENTS

Description will now be given of an embodiment of a database control system to manage processing for a database including a shared table which can be referred to by a plurality of back-end servers.

Figure 1:
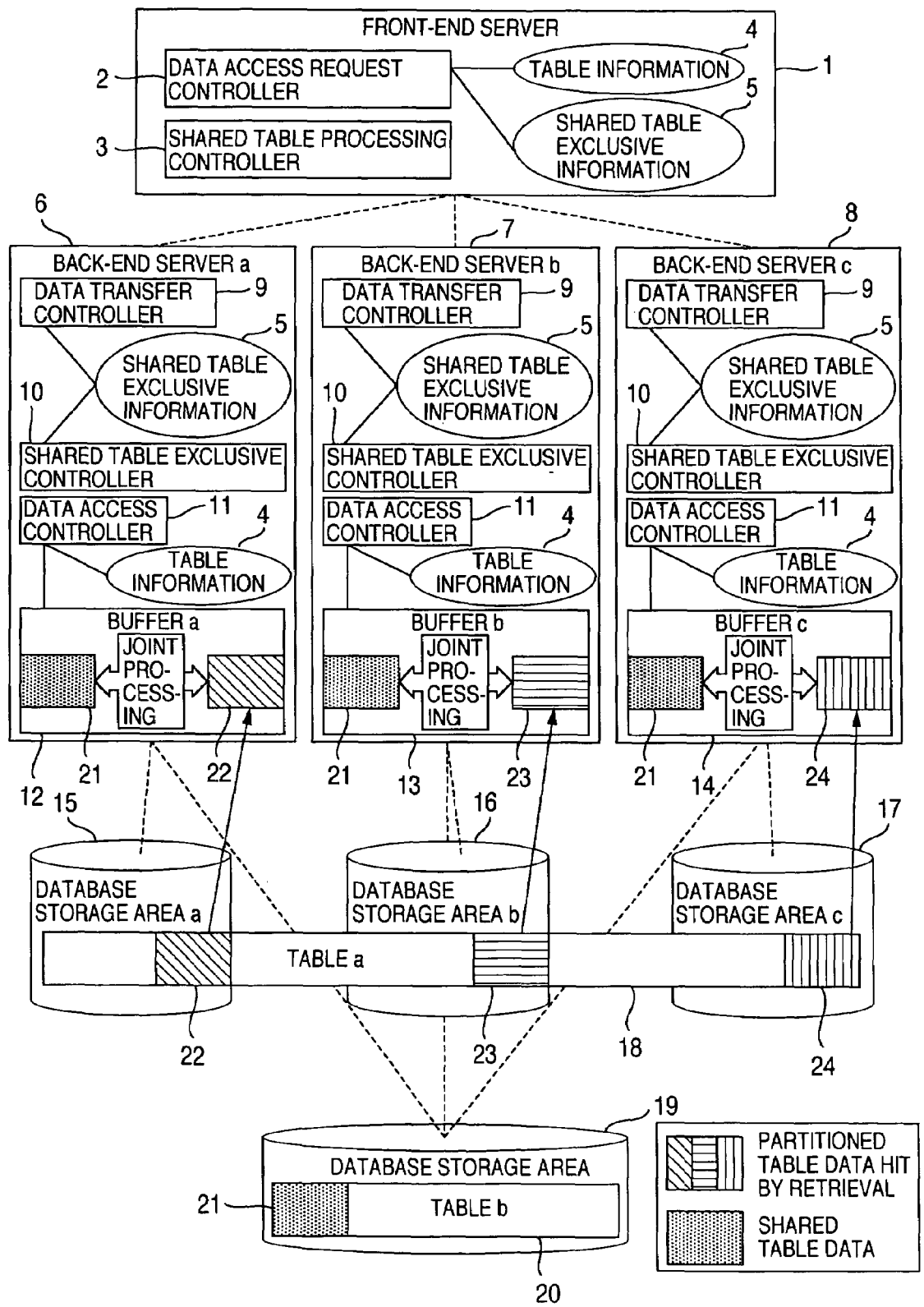
FIG. 1 is a block diagram showing an example of joint retrieval using a partitioned table and a shared table.

FIG. 1 shows an example of joint retrieval associated with a partitioned table and a shared table. The example of FIG. 1 is joint retrieval using a table (partitioned table) partitioned and stored in a plurality of database storage areas and a table (shared table) in a database storage area which can be referred to by any back-end server in a state other than a table exclusive state of the shared table.

As can be seen from FIG. 1, a front-end server 1 includes a data access request controller 2, a shared table processing controller 3, table information 4, and shared table exclusive information 5. A back-end server a 6 (b 7, c 8) includes a data transfer controller 9, shared table exclusive information 5, a shared table exclusive controller 10, a data access controller 11, table information 4, and a buffer a 12 (b 13, c 14).

To conduct joint retrieval for the table a 18 and the table b 20, the front-end server 1 issues an associated indication. In response thereto, the back-end servers a 6, b 7, and c 8 access a table a. Thereafter, data resultant therefrom is read in a buffer a 12 of the back-end server a 6, a buffer b 13 of the back-end server b 7, and a buffer c 14 of the back-end server c 8. If the data of the table b has been read in the buffers a 12, b 13, and c 14, each back-end server executes joint processing of the data of the table a 18 and the data of the table b 20 by use of the data in the buffers a 12, b 13, and c 14 and then returns a joint result of the joint processing to the front-end server 1.

By executing the joint processing of the tables a 18 and b 20 by each back-end server, the SQL execution is improved in performance due to the parallel execution. This suppresses the concentration of load on a particular back-end server. Further, this works to reduce the amount of transfer data as compared with a case in which the joint processing of the tables is executed by one back-end server, since only joint result data is transferred.

If table b 20 is in the table exclusive state, after each back-end server transfers the data obtained as a result of the access to the table a 18 to the allocated back-end server of the table b 20, the allocated back-end server executes joint processing of the table a 18 and the table b 20 and then returns a result of the joint processing to the front-end serve 1.

Figure 2:
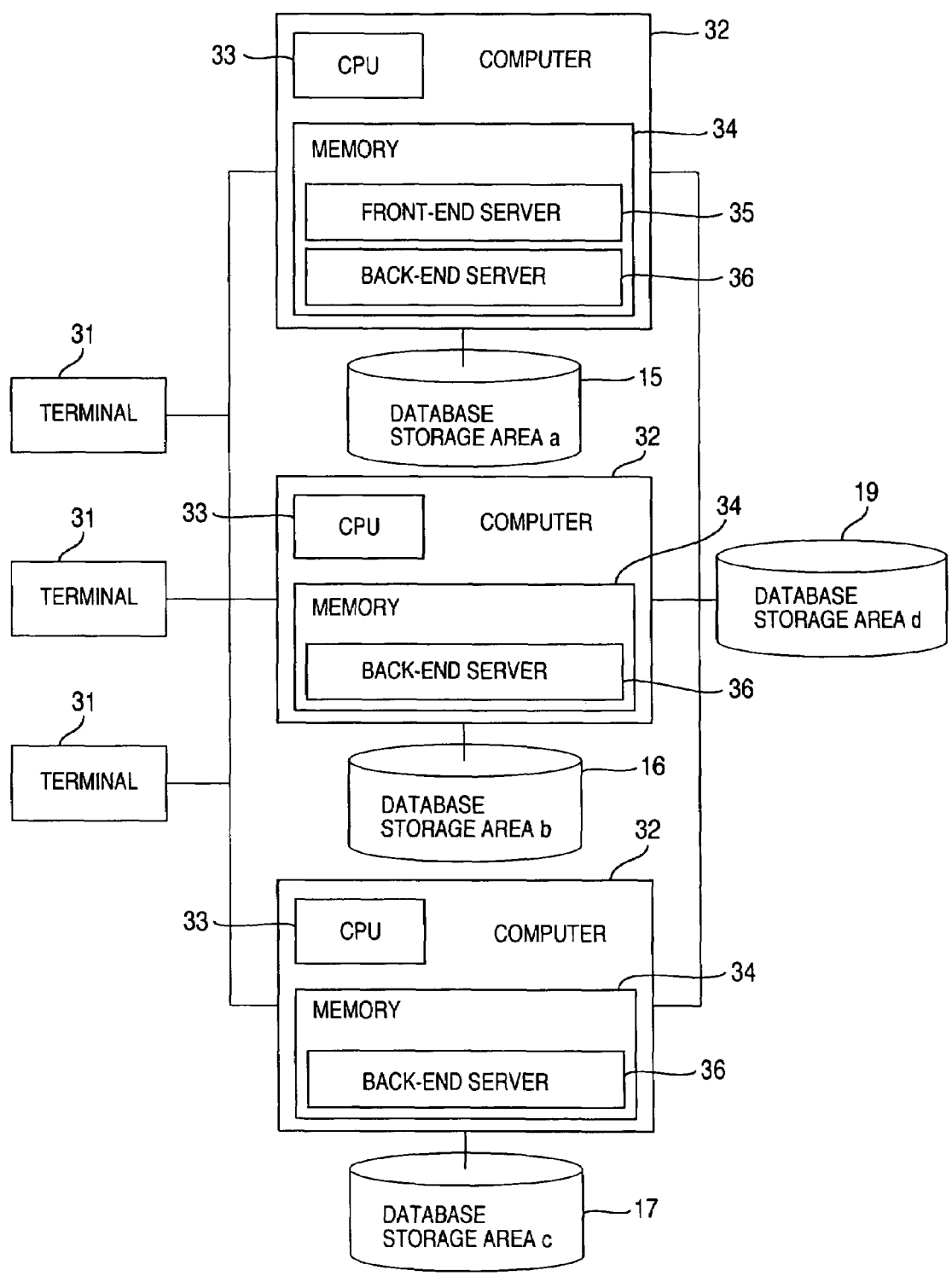
FIG. 2 is a block diagram showing an overall hardware configuration of a database management system.

FIG. 2 shows an overall hardware configuration of the embodiment of a database management system. The system of FIG. 2 includes computers 32 to control database storage areas, database storage areas 15, 16, 17, and 19 of, for example, magnetic storages, and terminals 31 which input indication information to use a database and which display thereon the contents of the database.

Each computer 32 includes a central processing unit (CPU) 33 and a memory 34. The memory 34 stores a program which determines a method of accessing the areas 15, 16, 17, and 19 and which thereafter makes the computer 32 function as a front-end server 35 to indicate the contents of execution to back-end servers 36. The memory 34 also stores a program to make the computer 32 function as a back-end server 36 to manage the database storage areas 15, 16, 17, and 19.

Figure 3:
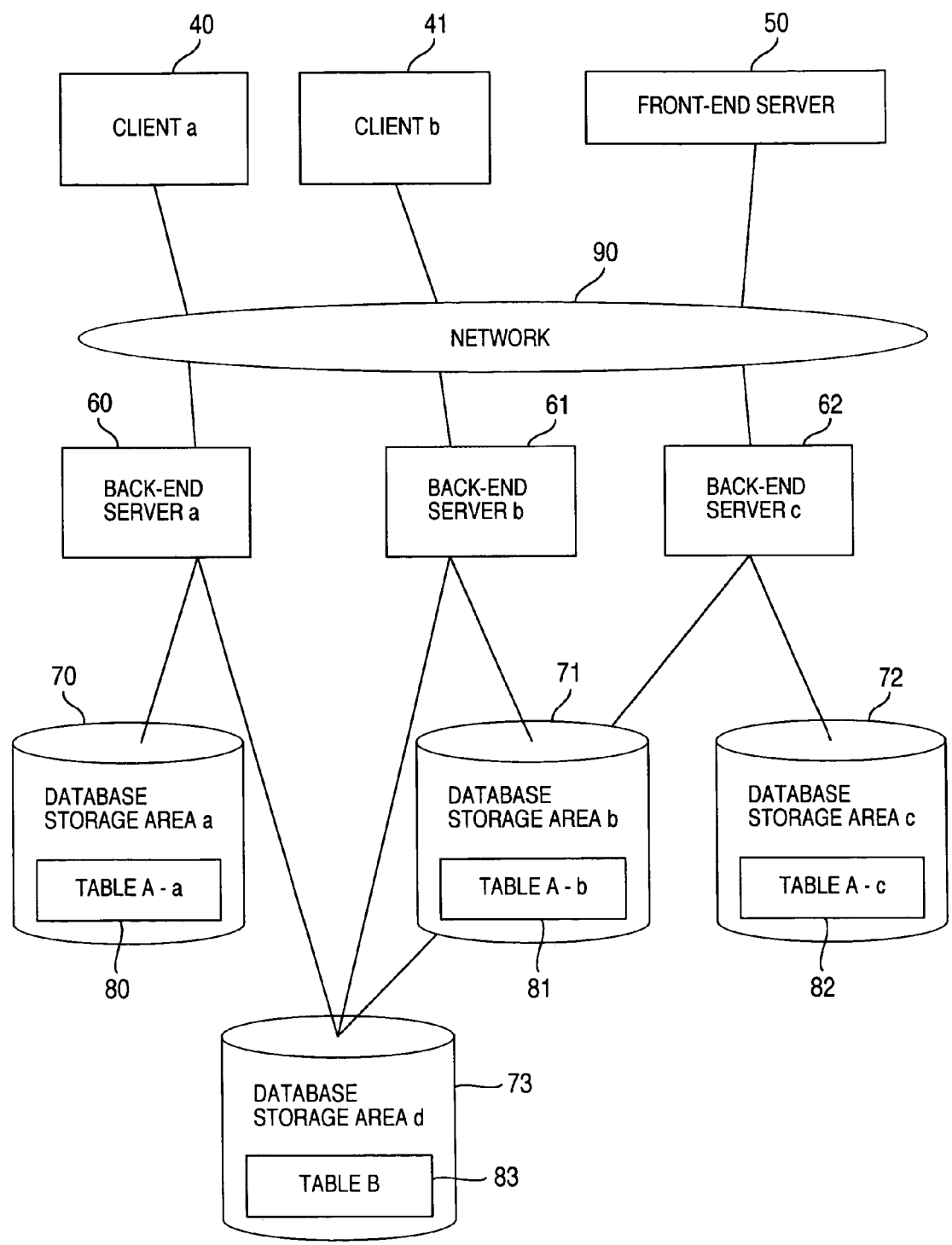
FIG. 3 is a schematic block diagram showing an outline of processing in a database management system.

FIG. 3 shows an outline of processing in the embodiment of a database management system. As shown in FIG. 3, when a user request from the user is received by a client a 40 or b 41 in the system of FIG. 3, the client transfers the request to a front-end server 50. The front-end server 50 executes processing to analyze an SQL statement and processing of optimization, determines a method of accessing tables A-a 80, A-b 81, A-c 82, and B 83; and then indicates the contents of execution to the back-end servers a 60, b 61, and c 62.

Table data items are respectively stored in the tables A-a 80, A-b 81, A-c 82, and B 83 respectively of database storage areas a 70, b 71, c 72, d 73. The front end server 50 receives the data items via the back-end servers a 60, b 61, and c 62. Finally, a result of the retrieval is returned to the client a 40 or b 41 to terminate the retrieval.

The respective servers are connected via a network to each other. The tables A-a 80, A-b 81, and A-c 82 are partitioned tables configured as below. That is, one table is subdivided into partitions to be stored in the database storage areas a 70, b 71, and c 72, respectively. The table B 83 is a shared table which can be referred to by the back-end servers a 60, b 61, and c 62.

Figure 4:
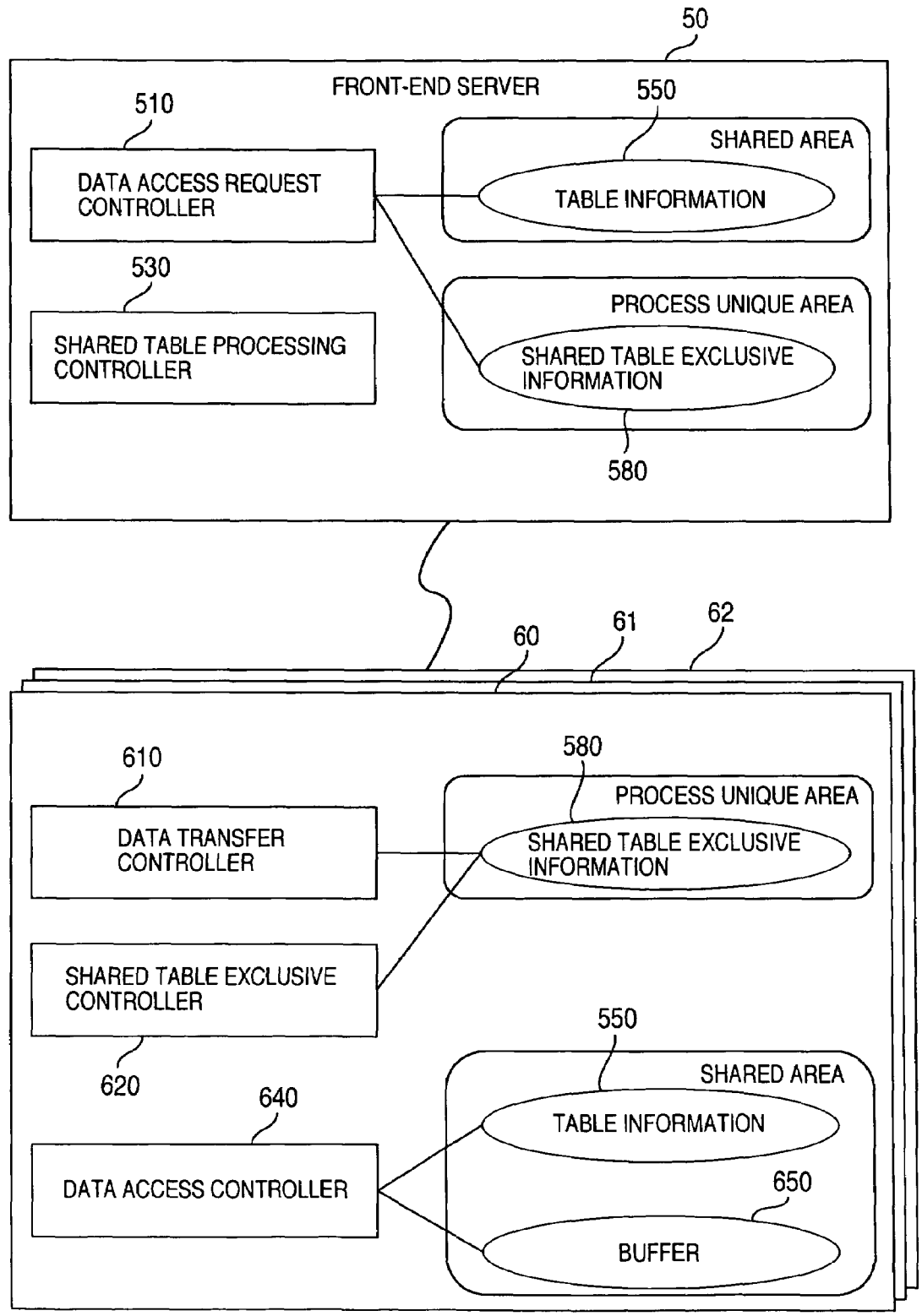
FIG. 4 is a block diagram showing configurations of a front-end server and a back-end server.

FIG. 4 shows configurations of the front-end and back-end servers in the embodiment. As can be seen from FIG. 4, the front-end server 50 includes a data access request controller 510 and a shared table processing controller 530.

The data access request controller 510 refers to table information 550 in a memory, the information indicating back-end servers allocated according to attributes of tables in the database and processing types. According to whether or not the processing request for the database includes processing for the shared table, the controller 510 selects back-end servers to execute the processing request. The controller 510 then sends a processing request to the selected back-end servers to execute the processing request.

When the processing request for the database requires processing for the shared and partitioned tables, the shared table processing controller 530 sets processing in which a plurality of back-end servers execute the database processing. When the processing request for the database requires processing for other than the shared and partitioned tables, the shared table processing controller 530 sets processing in which one back-end server executes the database processing.

It is assumed that a program which makes the front-end server 50 function as the data access request controller 510 and the shared table processing controller 530 is once recorded in a recording medium such as a compact disk read only memory (CD-ROM) and is then stored in, for example, a magnetic disk. In operation, the program is loaded from the storage in a memory for execution thereof. The recording medium to record the program may be a recording medium other than the CD-ROM. Also, the program may be installed from the recording medium in an information processor for use thereof. Alternatively, the system may access the recording medium via a network to utilize the program.

The back-end server includes a data transfer controller 610, a shared table exclusive controller 620, and a data access controller 640.

The data transfer controller 610 is a processing unit to control transfer of table data between the back-end servers. The shared table exclusive controller 620 updates, when the shared table is set to a table exclusive state, the shared table exclusive information 580 in the process unique area. The data access controller 640 is a device to access a database according to a database processing request received from the front-end server 50.

A program which makes each of the back-end servers function as the data transfer controller 610, the data transfer controller 610, and the data access controller 640 is once recorded in a recording medium such as a CD-ROM an is the stored in, for example, a magnetic disk. The program is thereafter loaded from the magnetic disk in a memory for execution thereof. The recording medium to record the program may be a recording medium other than the CD-ROM. Also, the program may be installed from the recording medium in an information processor for use thereof. Or, the system may access the recording medium via a network to use the program.

The front-end serve 50 attains table information of each table required for its operation from the table information 550 in the shared area by use of the data access request controller 510. The server 50 acquires exclusive information of the shared table from the shared table exclusive information 580 in the process unique area by use of the data access request controller 510. Also, the server 50 sets by the shared table processing controller 530 the number of execution back-end servers for joint retrieval associated with the shared table.

In the joint retrieval associated with the shared table, the back-end server first acquires the table exclusive information of the shared table from the shared table exclusive information 580 in the process unique area and sets by the data transfer controller 610 a method of transferring table data according to the contents of the table exclusive information. If the shared table is set to a table exclusive state, the back-end server updates by the shared table exclusive controller 620 the shared table exclusive information 580. The back-end server obtains necessary table information by the data access controller 640 from the table information 550 and necessary table data by the controller 640 from a buffer 650.

FIG. 5 shows in a diagram an example of the table information 550 in the embodiment. As shown in FIG. 5, the table information 550 includes in each entry thereof a table name 551 as a key, information of a shared table attribute 552 indicating whether or not the associated table is a shared table, information of an allocated back-end server name 553 indicating a back-end server allocated to table update, and information of a referring back-end server name 554 indicating a back-end server allocated to operation of referring to a table.

As can be seen from FIG. 5, for the table A-a, the shared table attribute is "no", the allocated back-end server is "back-end server a", and the referring back-end server is "back-end server a". For the table A-b, the shared table attribute is "no", the allocated back-end server is "back-end server b", and the referring back-end server is "back-end server b". For the table A-c, the shared table attribute is "no", the allocated back-end server is "back-end server c", and the referring back-end server is "back-end server c". For the table B, the shared table attribute is "yes", the allocated back-end servers are "back-end server b", and the referring back-end servers are "back-end server a", "back-end server b", and "back-end server c".

FIG. 6 shows an example of the shared table exclusive information 580 in the embodiment. As can be seen from FIG. 6, the information 580 includes a shared table identification (ID) in the exclusive state. When there exists one shared table set to the exclusive state and the table has an identification code of "0x00009999", the code is set to the field 581 of the information 580.

In the embodiment of the database management system, it is assumed that when an allocated back-end server updates a shared table, a period of time from a start of the update to an end of associated synchronization control is set to a table exclusive state. Therefore, the identification of the shared table is set to the shared table exclusive information 580 to prevent the other back-end servers from accessing the shared table.

Therefore, according to the embodiment, the shared table exclusive information 580 keeps the identification code of the shared table for which a joint operation is conducted for joint retrieval. When it is indicated that the shared table is in the table exclusive state, the system sets a data transfer operation in which table data of a table to be joined with the shared table is transferred to an allocated back-end server performing the exclusive control.

Figure 7:
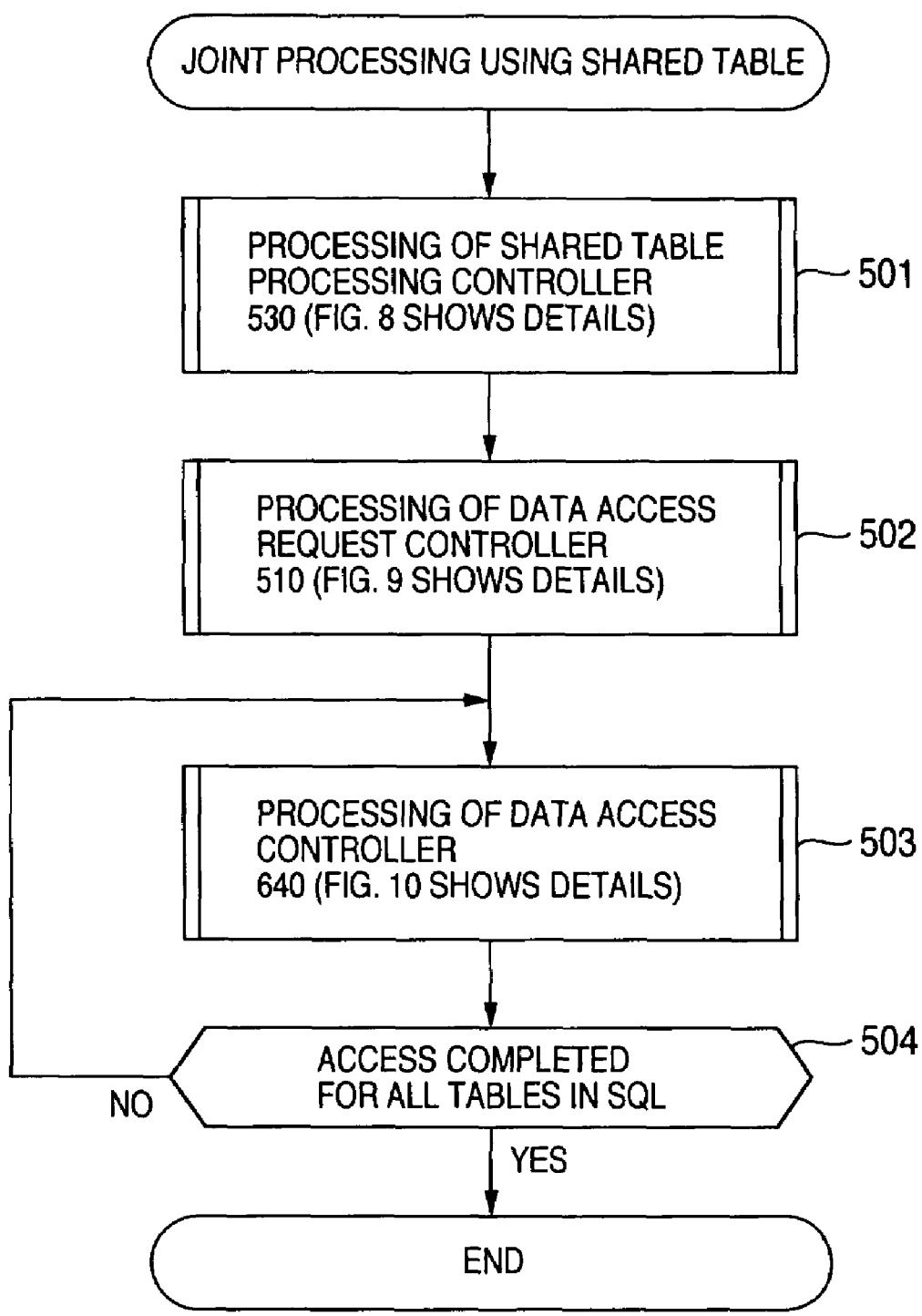
FIG. 7 is a flowchart showing a procedure of joint processing using a shared table.

FIG. 7 is a flowchart showing a procedure of the joint processing associated with a shared table in the embodiment. As shown in FIG. 7, when a processing request for joint processing of a shared table is received from a client, the shared table processing controller 530 checks in step 501 the contents of an SQL statement inputted as the processing request to determine whether or not the processing is to be executed by a plurality of back-end servers.

In step 502, the data access request controller 510 selects a back-end server to conduct access for retrieval and update and then issues a request for retrieval or update to the selected back-end server.

In step 503, the data access controller 640 accesses, by the back-end server selected in step 502, data according to a requested processing type from the SQL statement.

In step 504, the controller 640 makes a check to determine whether or not the access has been completed for all tables in the SQL statement being executed. As a result, if the access is required for another table, control goes to step 503 to execute again the processing as above. If the access has been completed for all tables, the system terminates the joint processing associated with a shared table.

Figure 8:
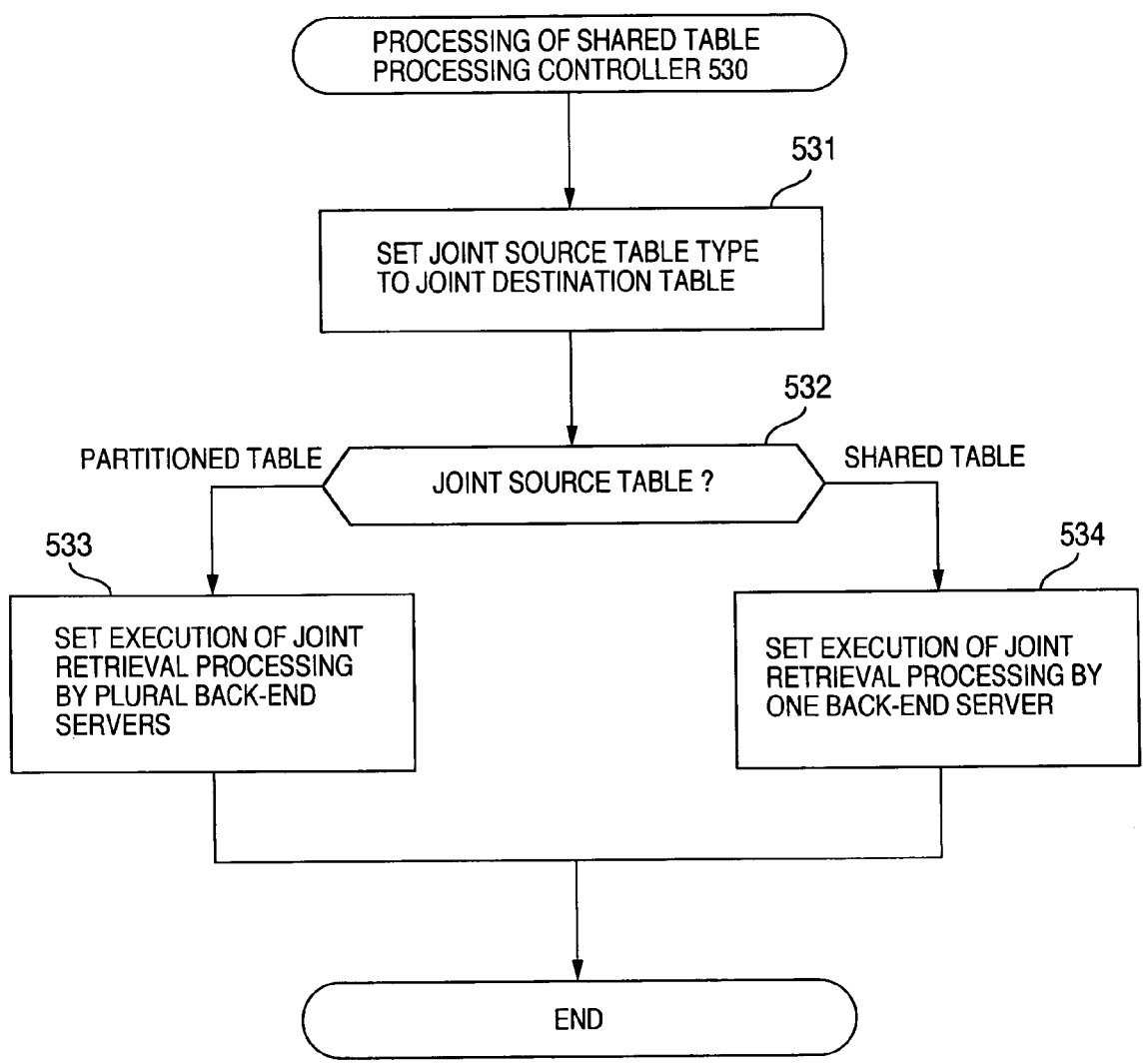
FIG. 8 is a flowchart showing a procedure of processing to set a shared table.

FIG. 8 shows in a flowchart a procedure of processing to set a shared table in the embodiment. As can be seen from FIG. 8, the shared table processing controller 530 in the front-end server 50 sets, when the input SQL statement indicates joint retrieval for a shared table and a partitioned table, joint retrieval by a plurality of back-end servers. If the SQL statement indicates joint retrieval for a shared table and a table other than a partitioned table, the server 50 sets joint retrieval by one back-end server.

When the SQL statement is received by the front-end server 50, the shared table processing controller 530 makes a check in step 531 to determine whether or not the SQL statement includes joint retrieval for a shared table. If the statement includes such joint retrieval, the controller 530 attains a joint source table type from the SQL statement and then sets the type in a memory area beforehand reserved as a joint destination table type storage area. In this connection, it is assumed that "joint destination table" indicates a shared table detected when a check is made to determine whether or not the SQL statement includes joint retrieval for a shared table. "Joint source table" indicates a table as a partner in the joint processing.

In step 532, the shared table processing controller 530 refers to the joint source table type obtained from the SQL statement to determine whether the joint source table is a partitioned table or a shared table. As a result, if the joint source table is a partitioned table, control goes to step 533 to store in a predetermined area of the memory an information item indicating that the joint retrieval is executed by a plurality of back-end servers. The system then terminates the processing of the processing controller 530.

As a result of step 532, if the joint source table is a shared table, control goes to step 534 to store in a predetermined area of the memory an information item indicating that the joint retrieval is executed by one back-end server. The system then terminates the processing of the processing controller 530.

Figure 9:
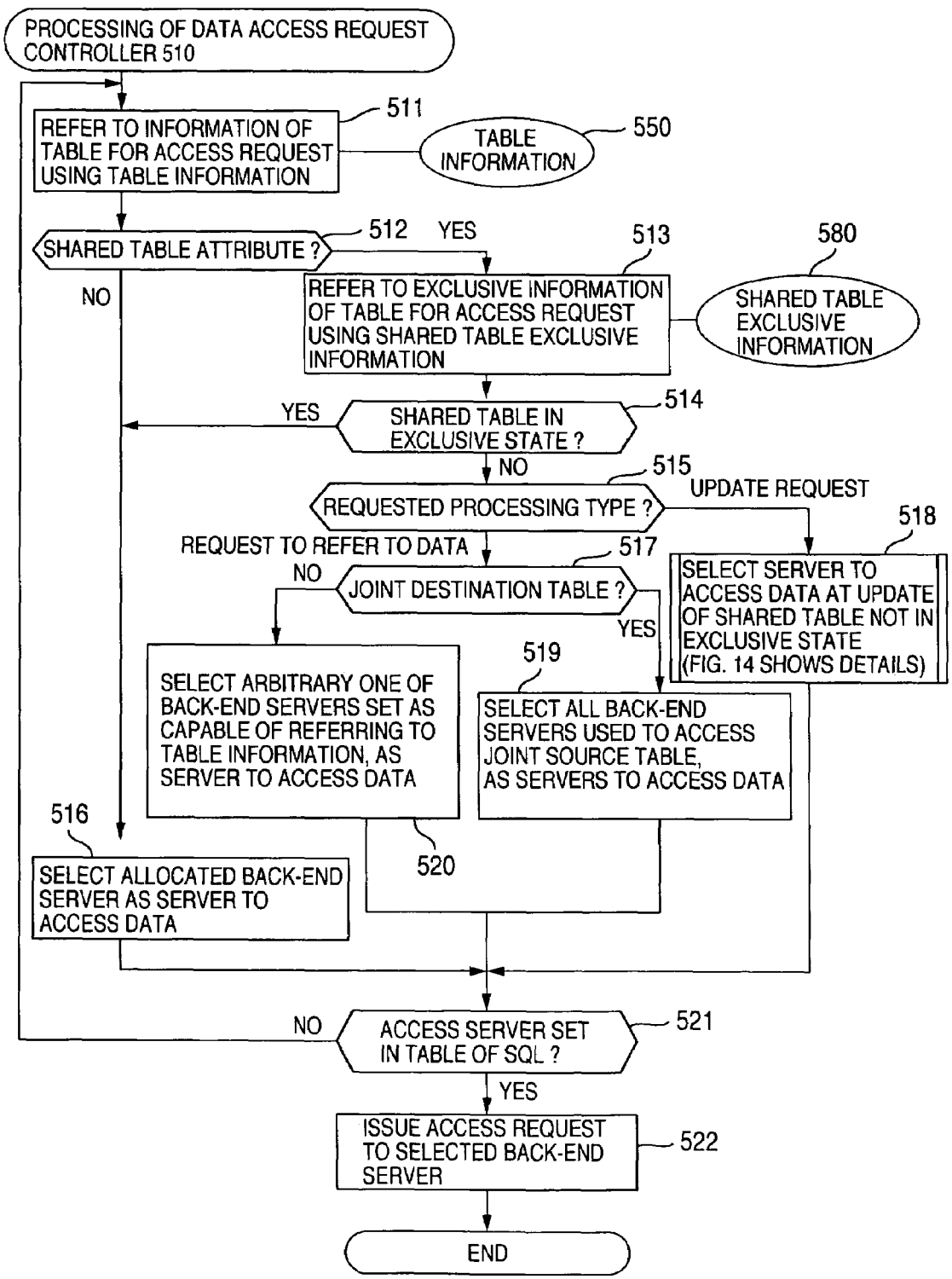
FIG. 9 is a flowchart showing a procedure of data access request control processing.

FIG. 9 is a flowchart showing a procedure of the data access request control processing in the embodiment. As shown in FIG. 9, the data access request controller 510 in the front-end server 50 selects a back-end server to access data for retrieval and update and then executes processing to issue an access request for retrieval or update to the selected back-end server.

When a data access request is issued, the data access request controller 510 refers in step 511 via the table information 550 to information of a table to which the access request is issued.

In step 512, the controller 510 makes a check using shared table attribute 552 in the table information 550 referred to in step 511. As a result, if the table is other than a shared table, the controller 510 goes to step 516 to select, as an accessing back-end server, a server indicated by an allocated back-end server name 553 of the table information 550.

On the other hand, as a result of the check using the shared table attribute 552 in the table information 550, if the table is a shared table, the controller 510 goes to step 513 to refer via the shared table exclusive information 580, to exclusive information of the shared table to which the access request is issued. In step 514, the controller 510 makes a check to determine whether or not the shared table is in the exclusive state. As a result, if the shared table is in the exclusive state, the controller 510 goes to step 516 to select, as an accessing back-end server, a server indicated by an allocated back-end server name 553 in the table information 550.

On the other hand, if the shared table associated with the access request is in other than an exclusive state, the data access request controller 510 goes to step 515 to determine a request processing type using the SQL statement. As a result, if the requested processing type indicates an update request, the controller 510 goes to step 518 to execute processing to select a server which accesses data during an update operation of the shared table in other than the exclusive state. In step 522, the controller 510 issues an access request to the back-end server for the access and then terminates the processing thereof.

On the other hand, as a result of the requested processing type, if the type indicates a request to refer to information, the data access request controller 510 goes to step 517 to determine whether or not the shared table is a joint destination table. Specifically, since joint source table types are set to the memory area reserved for the joint destination table types in the processing of step 531 as above, the controller 510 refers to the memory area having stored the joint source table types. If an associated table type of the shared table has been set to the area, the controller 510 assumes that the shared table is a joint destination table. Otherwise, the controller 510 assumes that the shared table is other than a joint destination table.

As a result of the processing, if the shared table of which the requested processing type is a request to refer to information is a joint destination table, the controller 510 goes to step 519 to select, as servers to access data, all back-end servers used to access the joint source table.

On the other hand, if the shared table of which the requested processing type is a request to refer to information is other than a joint destination table as a result of the processing, the data access request controller 510 goes to step 520 to select, as a server to access data, an arbitrary back-end server from the back-end servers set in the table information as referring back-end server which can refer to information.

In step 521, a check is made to determine whether or not the setting operation has been completed for all back-end servers accessing the table in the SQL statement being executed. As a result, if there remains a back-end server for the setting operation, the system executes processing in step 511 and subsequent steps for a table for which the accessing back-end server has not been set. If the setting operation has been completed for the back-end servers, control goes to step 522. The data access request controller 510 issues an access request to the back-end servers selected in step 516, 518, 519, or 520 and then terminates the processing thereof.

Figure 10:
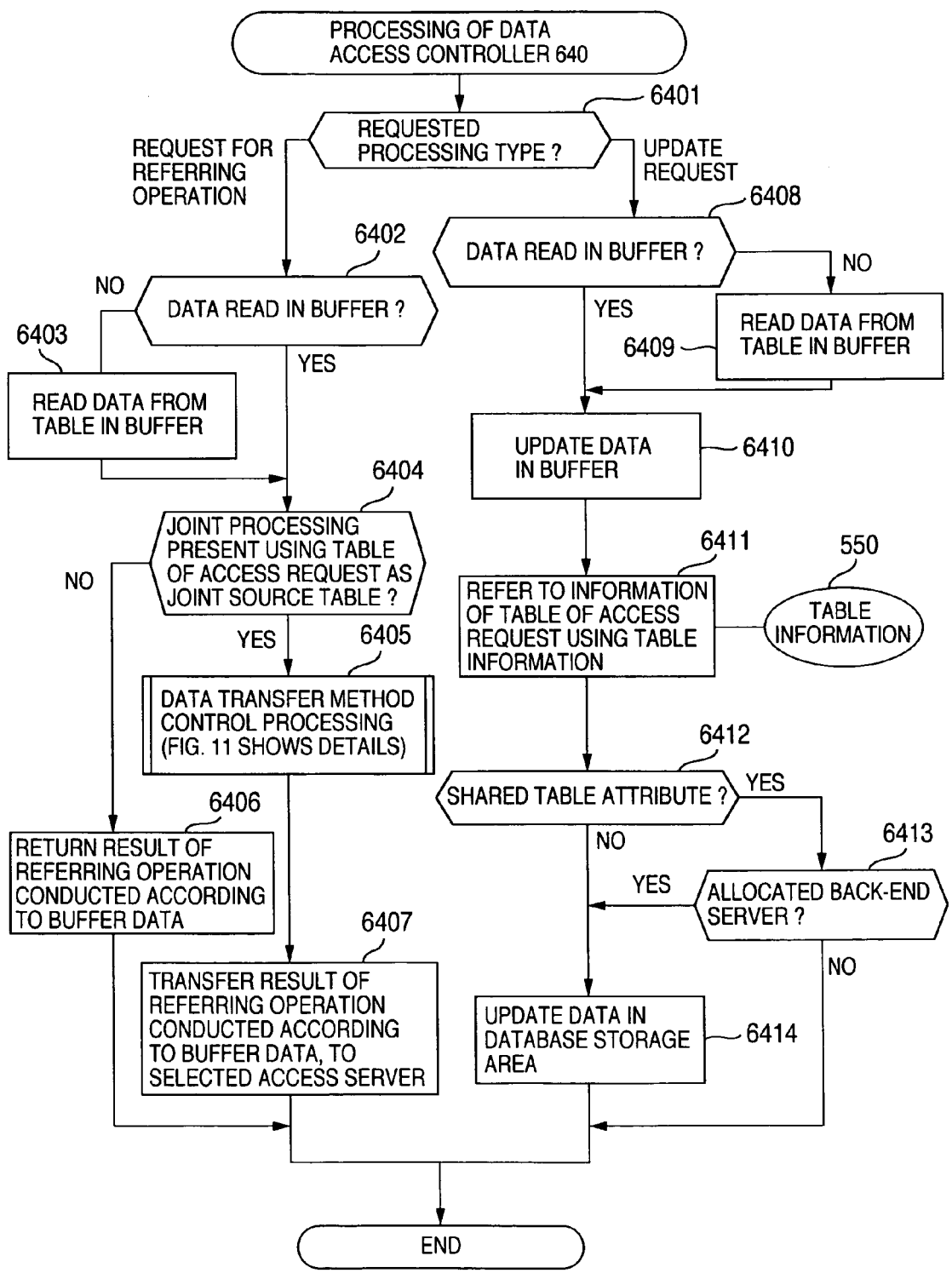
FIG. 10 is a flowchart showing a procedure of data access control processing.

FIG. 10 is a flowchart showing a procedure of the data access control processing in the embodiment. As shown in FIG. 10, the data access controller 640 of the back-end server 60 accesses data according to an access request from the data access request controller 510.

First, the access controller 640 determines a requested processing type using the SQL statement. As a result, if the type indicates a request to refer to information, control goes to step 6402. A check is made in step 6402 to determine whether or not data of the table for the access request exists in a buffer of the back-end server selected for access. If the data is in the buffer, control then proceeds to step 6404. Otherwise, the access controller 640 reads data from the table in the buffer in step 6403 and control goes to processing in step 6404.

If the data exists in the buffer, a check is made in step 6404 to determine according to the SQL statement whether or not there exists joint processing in which the table for the access request is a joint source table. As a result, if such table is absent, the access controller 640 sends to higher-level processing a result of referring operation conducted according to the data in the buffer and then terminates the processing thereof.

On the other hand, if there exists joint processing in which the table for the access request is a joint source table, the access controller 640 executes data transfer method control processing in step 6405 and returns in step 6407 a result of referring operation conducted according to the buffer data to the back-end server selected by the data access request controller 510 to access a joint destination table. The controller 640 then terminates the processing thereof.

As a result of the determination of the requested processing type in step 6401, if the processing type indicates an update request, a check is made in step 6408 to determine whether or not the data of the table for the access request exists in a buffer of the back-end server selected for the access. If the data is in the buffer, control goes to step 6410. If the data has not been read in the buffer, data is read from the table of the access request in the buffer in step 6409 and then process goes to step 6410. If the data exists in the buffer, the buffer data of the table for the access request is updated in step 6410.

In step 6411, the data access controller 640 refers to information of the table by use of the table information 550. In step 6412, the controller 640 checks, according to a shared table attribute, the table information 550 referred to in step 6411. As a result, if the table is other than a shared table, process goes to step 6414. The access controller 640 updates, by the back-end server selected for the access, the table data for the access request in the database storage area and then terminates the processing.

On the other hand, if the table for the access request is a shared table, process goes to step 6413. Using the table information 550, the access controller 640 makes a check to determine whether or not the back-end server selected by the data access request controller 510 is an allocated back-end server in the table for the access request. If the server is not the allocated back-end server, the system terminates the processing of the data access controller 640.

On the other hand, as a result of the determination, if the back-end server selected by the request controller 510 is an allocated back-end server of the table for the access request, process goes to step 6414. The access controller 640 updates, by the selected back-end server, the table data for the access request in the database storage area to thereby terminate the processing.

Figure 11:
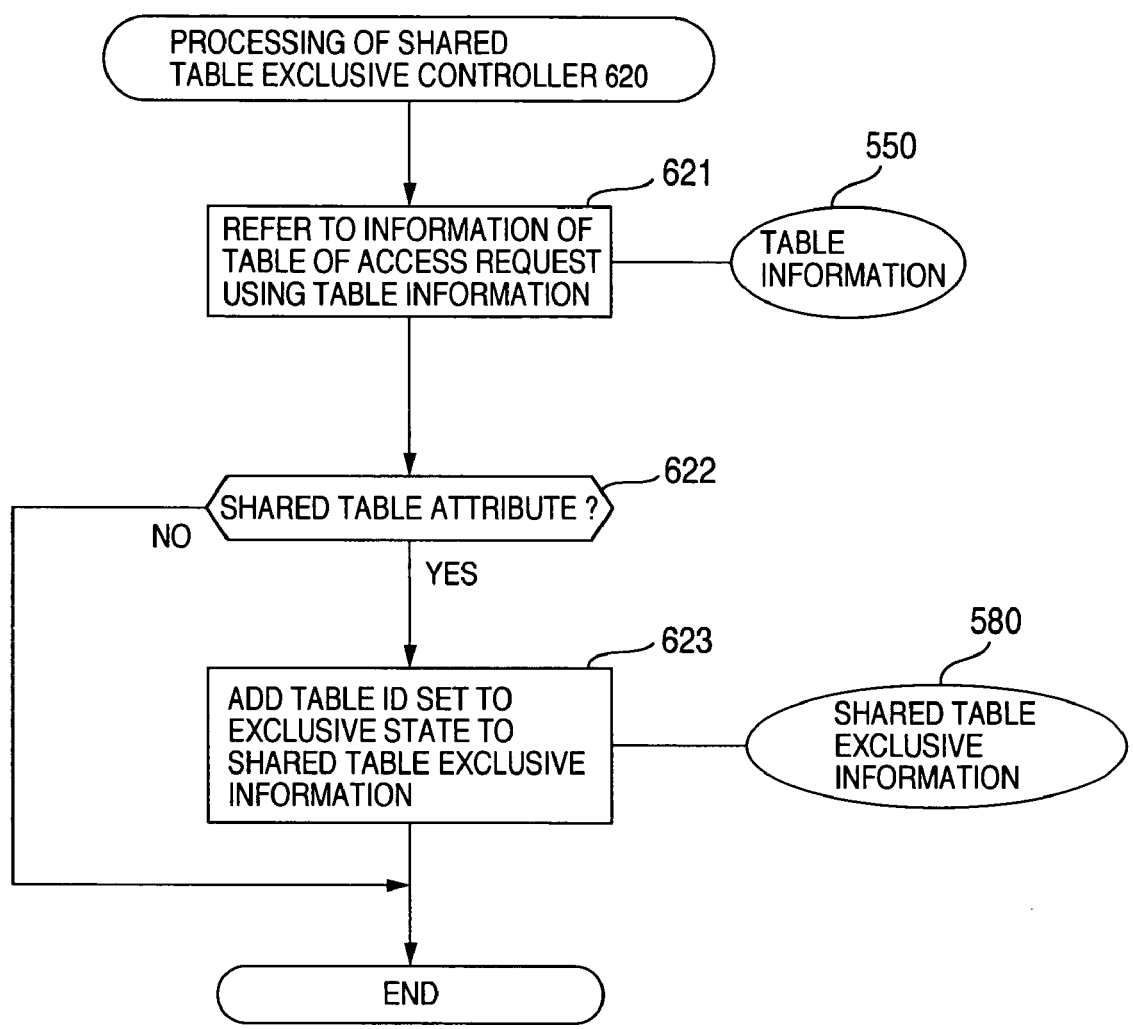
FIG. 11 is a flowchart showing a procedure of shared table exclusive information processing.

FIG. 11 is a flowchart showing a procedure of the shared table exclusive information processing in the embodiment. As can be seen from FIG. 11, the shared table exclusive controller 620 in the back-end server 60 manages the table exclusive information of the shared table. In an operation to update the shared table by an allocated back-end server, the exclusive controller 620 sets the shared table to a table exclusive state for a period of time from a start of the update operation to an end of an associated synchronization control operation. Specifically, the exclusive controller 620 sets an identification code of the shared table to the shared table exclusive information 580 to prevent the other back-end servers from accessing the shared table.

When an SQL statement associated with a table exclusive operation is executed, the exclusive controller 620 refers to the table information 550 to attain information of a table for the table exclusive operation in step 621. A check is made in step 622 to determine the shared table attribute of the table information 550. As a result, if the table is other than a shared table, the system terminates the processing of the exclusive controller 620. On the other hand, if the table is a shared table, the exclusive controller 620 adds in step 623 a table identification code of the table to the shared table exclusive information 580 to thereby terminate the processing.

It is assumed in the operation that if a synchronization control operation is conducted after the update of the shared table data in the buffers of the respective back-end servers 60 so that the contents of the shared tables synchronize with each other, the system deletes the identification code of the pertinent shared table in the shared table exclusive information 580.

Figure 12:
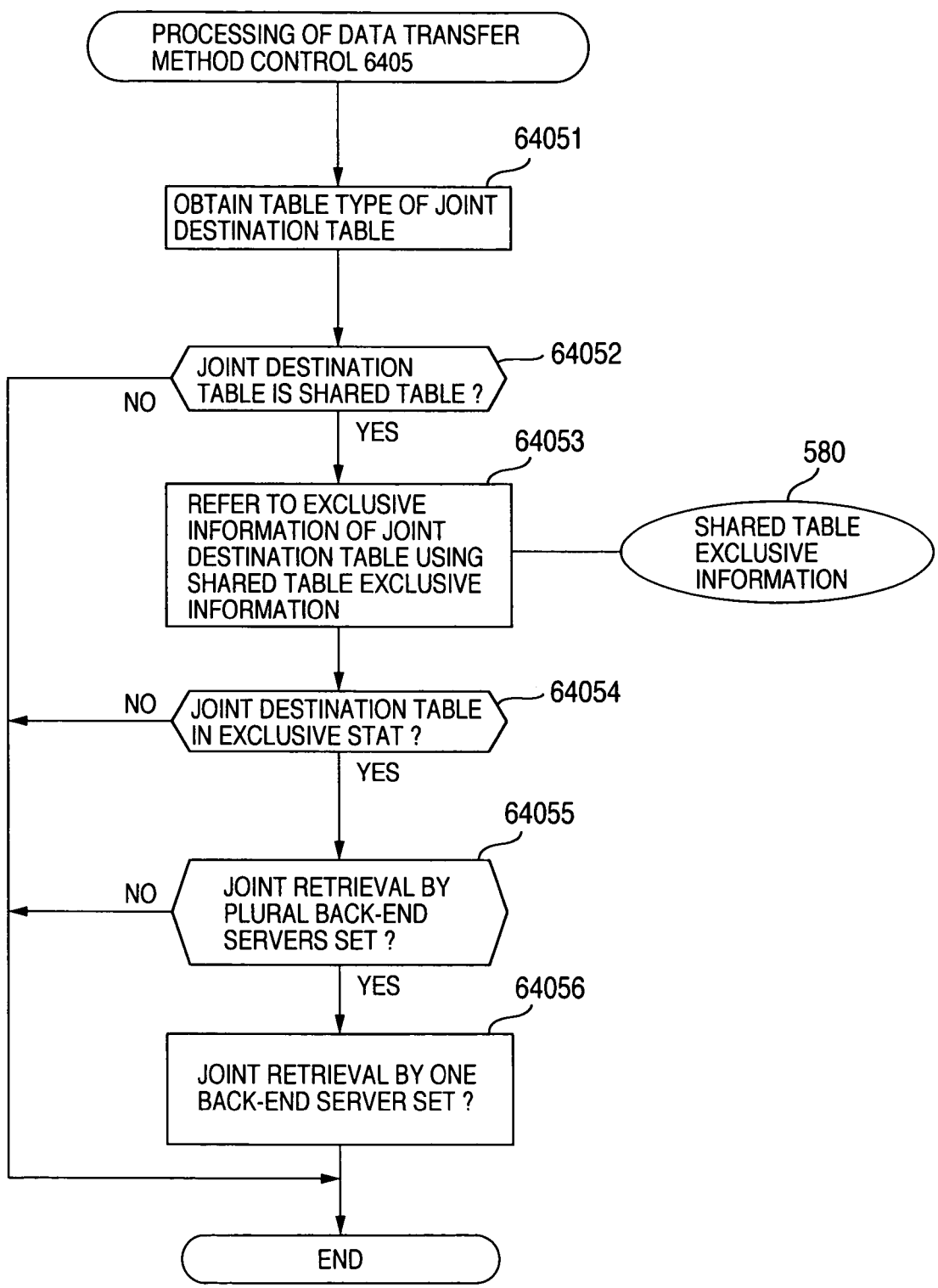
FIG. 12 is a flowchart showing a procedure of data transfer method control processing.

FIG. 12 is a flowchart showing a procedure of the data transfer method control processing in the embodiment. In the procedure of FIG. 12, the data access controller 640 executes data transfer method control processing in step 6405 to set a data transfer method to transfer data of a joint partner table to a shared table.

The data access controller 640 acquires in step 64051 a table type of the joint destination table from the SQL statement inputted to the system. A check is made in step 64052 to determine by use of the table type whether or not the joint destination table is a shared table. As a result, if the table is other than a shared table, the processing of step 6405 is terminated.

On the other hand, if the table is a shared table, the data access controller 640 proceeds to step 64053 to refer via the shared table exclusive information 580 to table exclusive information of the joint destination table. The controller 640 then makes a check in step 64054 to determine according to the shared table exclusive information 580 whether or not the shared table of the joint destination is in a table exclusive state. If the table exclusive operation has not been conducted, the system terminates the processing of step 6405.

If the table exclusive operation has been conducted, the data access controller 640 makes a check in step 64055 to determine whether or not the shared table processing controller 530 has set processing in which a plurality of back-end servers conducts joint retrieval. If such processing has not been set, the system terminates the processing of step 6405. Otherwise, the data access controller 640 sets processing in which one back-end server conducts joint retrieval and then terminates the processing thereof.

Figure 13:
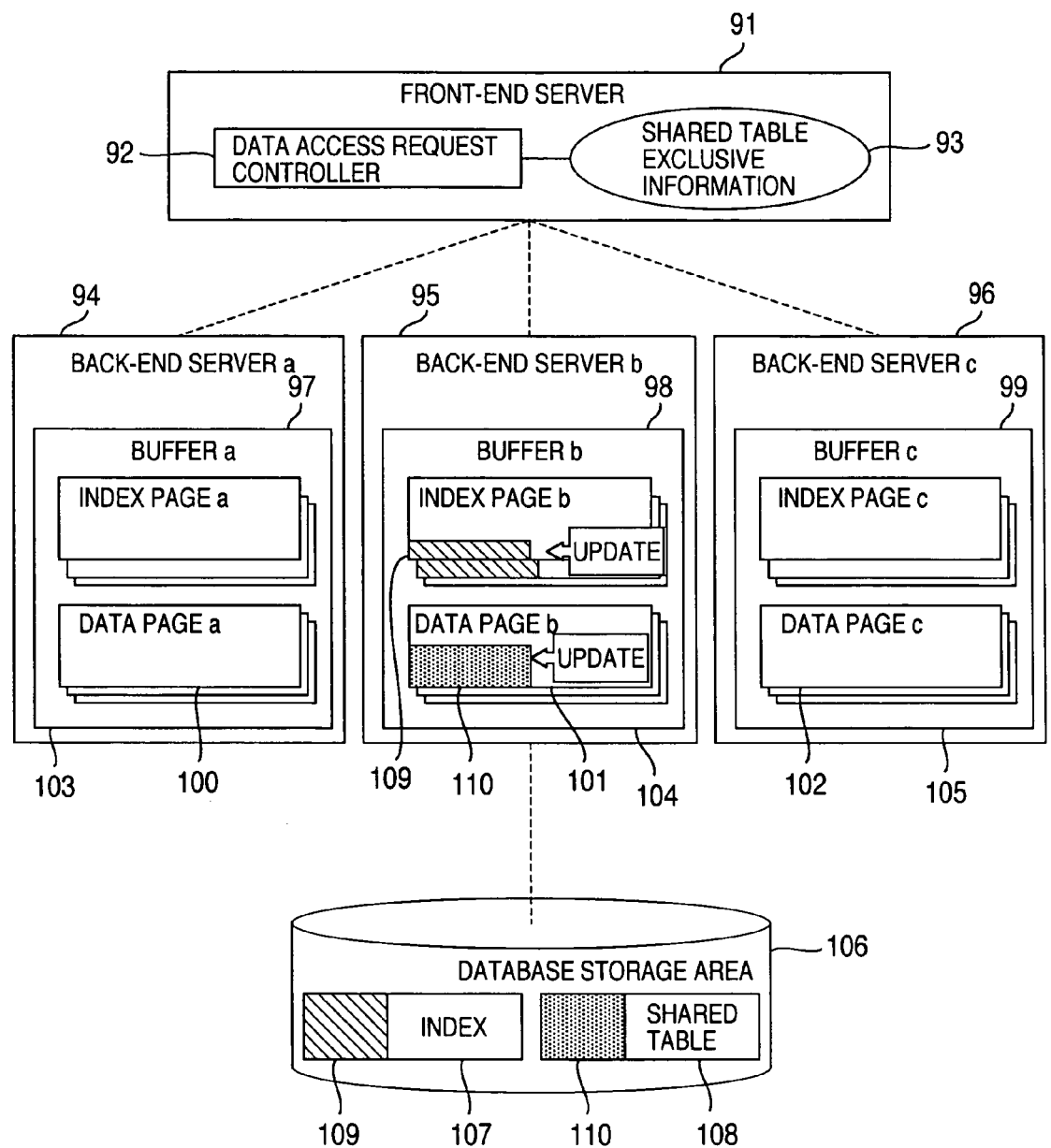
FIG. 13 is a schematic block diagram showing an example of shared table update processing including update of an index string.

FIG. 13 shows an example of the shared table update processing including update of an index string in the embodiment. When the shared table update is associated with a plurality of transactions, there possibly occurs a case in which the sequence of updating the index key value varies in an index page of a buffer in each back-end server. In addition, when each back-end server reads data, which is not stored in the buffer before, from an associated table in the database storage area, the data layout considerably varies between the back-end servers. To overcome this difficulty, it is required that the shared table is set to a table exclusive state to keep the update sequence. Thereafter, the shared table update including update of an index is conducted by one back-end server.

Therefore, to update a shared table including update of an index, a data access request controller 92 refers via the shared table exclusive information 93 the exclusive information of the shared table 108. If the table 108 is in the table exclusive state, a back-end server b 95 which is an allocated back-end server for the shared table 108 updates, in response to an indication from a front-end server 91, an index page b 98 and index data in a data page b 101 of the buffer b 104.

Figure 14:
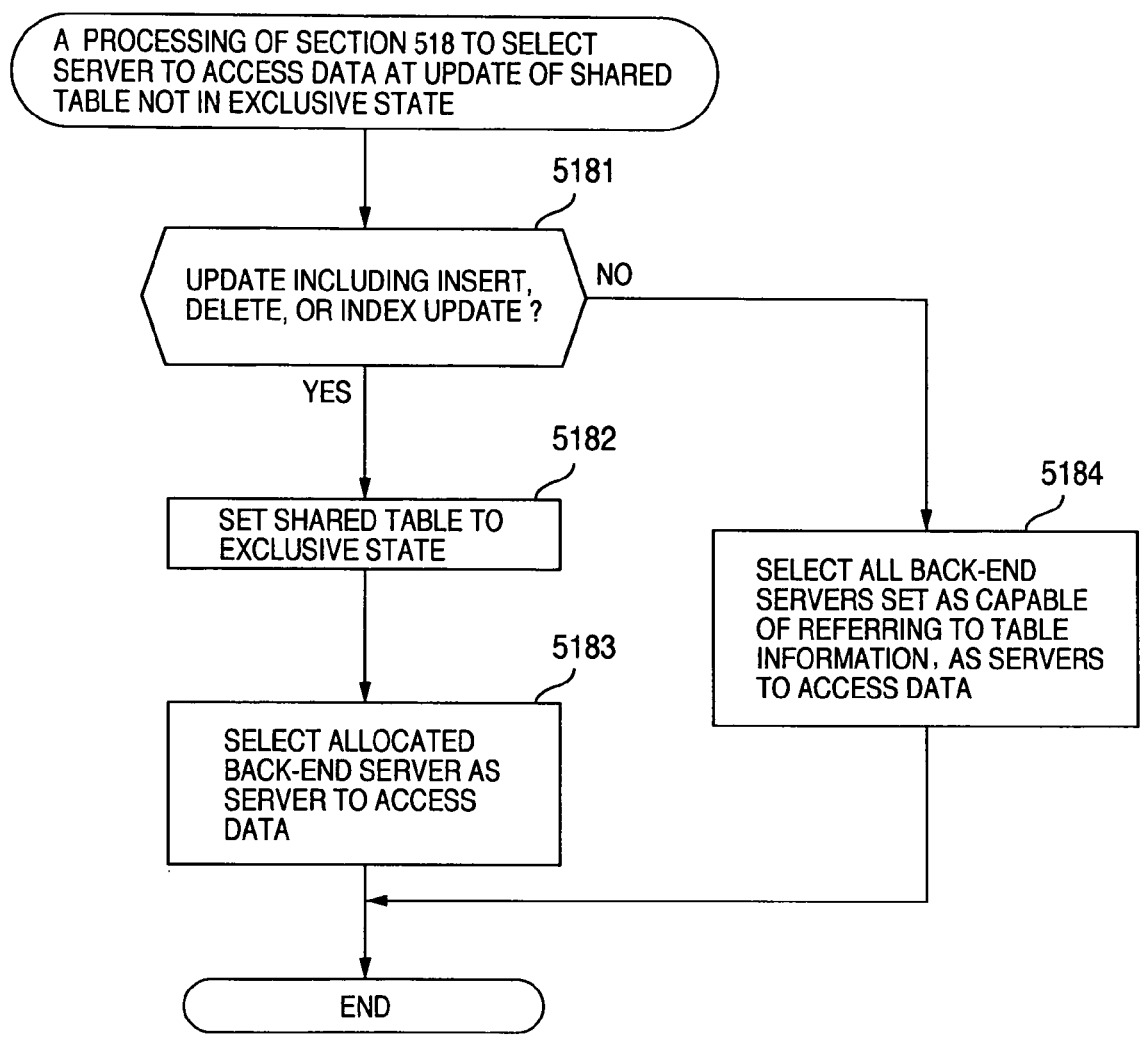
FIG. 14 is a flowchart showing a procedure of processing to select a server to access data.

FIG. 14 is a flowchart showing a procedure of the processing to select a server to access data when a shared table not in a table exclusive state is updated in the embodiment. Specifically, this is processing executed by the data access request controller 510 to select a server to access data when a shared table not in a table exclusive state (step 518).

In the processing of step 518, the controller 510 executes step 5181 to determine whether the SQL statement is an INSET statement, a DELETE statement, or an UPDATE statement associated with index update.

As a result, if the SQL statement is one of the above statements, the shared table is set to a table exclusive state and then control goes to step 5183. The data access request controller 510 selects in step 5183 the allocated back-end server as a server to access data to thereby terminate the processing of step 518.

On the other hand, if the SQL statement is neither one of the above statements, all back-end servers set in step 5184 as referring back-end servers capable of referring to data are set as servers to access data, and then the processing of step 518 is terminated.

According to the embodiment of a database management system described above, depending on whether or not the processing request for the database includes processing for a shared table, the system selects at least one database processing device to access the database. It is hence possible to efficiently execute database processing including processing for the shared table.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A database management method of managing processing for a database, the method comprising steps of:
    providing a database management system including a data access request controller, a plurality of database processing devices, first database storage areas which store partitioned tables divided from one table by key ranges, each first database storage area of the first database storage areas being accessed by a database processing device of the plurality of database processing devices, and a second database storage area which stores a shared table, the second database storage area being accessed by the plurality of database processing devices;
    at a computer, using the data access request controller, referring to table information via a storage when issuing a processing request to the database processing device to execute processing for the database, the table information indicating the database processing devices allocated according to an attribute of a table in the database and a processing type, the computer including a processor;
    using the data access request controller, selecting, according to whether or not the processing request for the database includes processing for a shared table, the database processing device to execute the processing request,
    using the database processing device, accessing the database according to the database processing request;
    in response to an input of a joint process request, analyzing the joint process request, and generating a joint process execution request to send to each database processing device of the database processing devices,
    receiving the joint process execution request at said each database processing device, in response to the received joint process execution request, accessing a partitioned table and the shared table to perform a joint process;
    in response to an input of a database query request, setting a first processing in which the plurality of database processing devices execute database processing if the database query request is a request to process the shared table and the partitioned table, and setting a second processing in which a database processing device of the database processing devices executes the database processing if the database query request is a request to process the shared table and a table other than the partitioned table, wherein the setting a first processing and the setting a second processing are based on the attribute of the table and the processing type;
    if the shared table is in an exclusive processing state, selecting the database processing device allocated to update the shared table for processing the database query request, and
    using the data access request controller, setting, in an operation to update the shared table by the allocated database processing device, shared table exclusive information in the storage, the shared table exclusive information indicating that the shared table is in a table exclusive state during a period of time from a start of the update of the shared table to an end of a synchronization control operation for shared table data in a buffer of said each database processing device of the database processing devices; and
    referring to the shared table exclusive information in an operation to execute processing for the shared table, and determining, if the shared table exclusive information has been set for the shared table, that the shared table is in an exclusive processing state.

2. The database management method according to claim 1, further comprising the steps of:
    selecting, if the shared table is not in an exclusive processing state and update processing is being executed in processing for the shared table contained in the database processing request, the database processing device allocated to the shared table for update processing; and by the data access request controller, issuing a database processing request to the selected database processing device.

3. The database management method according to claim 1, further comprising the steps of: selecting, if the shared table is not in an exclusive processing state and update processing is being executed in the processing for the shared table contained in the database processing request, the plurality of database processing devices which refer to the shared table; and issuing a database processing request to the selected database processing devices.

4. The database management method according to claim 1, wherein the data access request controller sets the shared table exclusive information by storing, in a storage, identification information of the shared table for which update processing is to be executed.

5. A database management system for managing processing for a database, the system comprising:
    a memory for storing the database;
    a processor;
    a plurality of database processing devices;
    first database storage areas which store partitioned tables divided from one table by key ranges, each first database storage area being accessed by a database processing device of the plurality of database processing devices;
    a second database storage area which stores a shared table, the second database storage area being accessed by the plurality of database processing devices, and
    a data access request controller and the database processing devices that are instructed to perform steps of:
    referring to table information via a storage when issuing a processing request to the database processing device to execute processing for the database, the table information indicating the database processing devices allocated according to an attribute of a table in the database and a processing type;

selecting, according to whether or not the processing request for the database includes processing for a shared table, the database processing device to execute the processing request, accessing the database according to the database processing request;

in response to an input of a joint process request, analyzing the joint process request, and generating a joint process execution request to send to each database processing device of the database processing devices, receiving the joint process execution request at said each database processing device, in response to the received joint process execution request, accessing a partitioned table and the shared table to perform a joint process;

in response to an input of a database query request, setting a first processing in which the plurality of database processing devices execute database processing if the database query request is a request to process the shared table and the partitioned table, and setting a second processing in which a database processing device of the database processing devices executes the database processing if the database query request is a request to process the shared table and a table other than the partitioned table, wherein the setting a first processing and the setting a second processing are based on the attribute of the table and the processing type;

if the shared table is in an exclusive processing state, selecting the database processing device allocated to update the shared table for processing the database query request, and setting, in an operation to update the shared table by the allocated database processing device, shared table exclusive information in the storage, the shared table exclusive information indicating that the shared table is in a table exclusive state during a period of time from a start of the update of the shared table to an end of a synchronization control operation for shared table data in a buffer of said each database processing device of the database processing devices; and referring to the shared table exclusive information in an operation to execute processing for the shared table, and determining, if the shared table exclusive information has been set for the shared table, that the shared table is in an exclusive processing state.

6. A computer readable recording medium storing a program which is executed by a computer to perform a database management method of managing processing for a database in a database management system, the database management system including a data access request controller, a plurality of database processing devices, a plurality of first database storage areas, each first database storage area of the first database storage areas being accessed by a database processing device of the plurality of database processing devices, and a second database storage area being accessed by the plurality of database processing devices, the method comprising steps of:

using the data access request controller, referring to table information via a storage when issuing a processing request to the database processing device to execute processing for the database, the table information indicating the database processing devices allocated according to an attribute of a table in the database and a processing type, wherein the first database storage areas store partitioned tables that are divided from one table by key ranges, and wherein the second database storage area stores a shared table;

using the data access request controller, selecting, according to whether or not the processing request for the database includes processing for a shared table, the database processing device to execute the processing request, using the database processing device, accessing the database according to the database processing request;

in response to an input of a joint process request, analyzing the joint process request, and generating a joint process execution request to send to each database processing device of the database processing devices, receiving the joint process execution request at said each database processing device, in response to the received joint process execution request, accessing a partitioned table and the shared table to perform a joint process;

in response to an input of a database query request, setting a first processing in which the plurality of database processing devices execute database processing if the database query request is a request to process the shared table and the partitioned table, and setting a second processing in which a database processing device of the database processing devices executes the database processing if the database query request is a request to process the shared table and a table other than the partitioned table, wherein the setting a first processing and the setting a second processing are based on the attribute of the table and the processing type;

if the shared table is in an exclusive processing state, selecting the database processing device allocated to update the shared table for processing the database query request, and using the data access request controller, setting, in an operation to update the shared table by the allocated database processing device, shared table exclusive information in the storage, the shared table exclusive information indicating that the shared table is in a table exclusive state during a period of time from a start of the update of the shared table to an end of a synchronization control operation for shared table data in a buffer of said each database processing device of the database processing devices; and referring to the shared table exclusive information in an operation to execute processing for the shared table, and determining, if the shared table exclusive information has been set for the shared table, that the shared table is in an exclusive processing state.

* * * * *